(12) United States Patent
Moinicken

(10) Patent No.: US 10,173,583 B2
(45) Date of Patent: Jan. 8, 2019

(54) EMERGENCY LIGHTING SYSTEM

(71) Applicant: Timothy Moinicken, Cottonwood, MN (US)

(72) Inventor: Timothy Moinicken, Cottonwood, MN (US)

(*) Notice: Subject to any disclaimer, the term of this patent is extended or adjusted under 35 U.S.C. 154(b) by 0 days.

(21) Appl. No.: 15/340,248

(22) Filed: Nov. 1, 2016

(65) Prior Publication Data

US 2018/0118098 A1    May 3, 2018

(51) Int. Cl.
| | | |
|---|---|---|
| *B60Q 1/30* | (2006.01) | |
| *B60Q 1/26* | (2006.01) | |
| *B60Q 1/00* | (2006.01) | |
| *F21S 43/14* | (2018.01) | |

(52) U.S. Cl.
CPC ............ *B60Q 1/30* (2013.01); *B60Q 1/0076* (2013.01); *B60Q 1/2615* (2013.01); *F21S 43/14* (2018.01)

(58) Field of Classification Search
CPC ...... B60Q 1/30; B60Q 1/0076; B60Q 1/2615; F21S 48/215; F21S 9/022; F21Y 2115/10
See application file for complete search history.

(56) References Cited

U.S. PATENT DOCUMENTS

| | | | | |
|---|---|---|---|---|
| 2007/0070618 | A1* | 3/2007 | Talamo | E01F 9/582 362/153.1 |
| 2008/0259621 | A1* | 10/2008 | Peron | B60Q 1/2615 362/487 |
| 2015/0203026 | A1* | 7/2015 | Schotanus | B60Q 1/24 362/520 |
| 2015/0251598 | A1* | 9/2015 | Andrews | B60Q 7/00 362/486 |

* cited by examiner

*Primary Examiner* — Kevin Quarterman
(74) *Attorney, Agent, or Firm* — Jerry D Haynes; Law Office of Jerry D Haynes PA

(57) ABSTRACT

An emergency lighting system that includes: a portable strip adapted for placement across a rear panel of a trailer; a series of LED lights extending across the strip; a means to attach the portable strip to the rear panel; and a power source for the portable strip. The means to attach preferably includes a series of eyelets. The power source is preferably a battery and includes an on and off switch.

6 Claims, 1 Drawing Sheet

EMERGENCY LIGHTING SYSTEM

BACKGROUND OF THE INVENTION

Field of Invention

The present invention relates to an emergency lighting system for a tractor trailer system.

Description of Related Art

The trucking industry involves over-road travel of tractor trailers. Millions of tractor trailers are on the road each day and are necessary for the transportation of goods and equipment across the country. Tractor trailers transport goods through various interstate highways and roadways. As a result, various hazards are inherent in this type of travel. In particular, trucks are occasionally involved in vehicle accidents or forced to pull over to the side of the road due to a mechanical issue. Once in this stationary position the truck may become a safety hazard for other passing vehicles and it is important that any oncoming vehicles should be able to visibly see the truck in order to adjust their speed and movement. Typically, a truck operator engages various hazard lights on the truck for visibility. However, it is imperative that a stalled truck, which may be blocking a lane, is visible to oncoming traffic at the greatest distance possible. This safety feature ensures that the oncoming traffic has adequate reaction time come to a stop and/or change their course of direction.

SUMMARY OF THE INVENTION

The present invention relates to an emergency lighting system that includes: a portable strip adapted for placement across a rear panel of a trailer; a series of LED lights extending across the strip; a means to attach the portable strip to the rear panel; and a power source for the portable strip. The means to attach preferably includes a series of eyelets. The power source is preferably a battery and includes an on and off switch.

DETAILED DESCRIPTION

The present invention relates to an emergency lighting system used in conjunction with a tractor trailer. The lighting system is attached to the rear panel of a trailer and relates to an emergency lighting system for attachment to a trailer. The emergency lighting system includes a strip that includes a series of LED lights across the length of the strip. The strip is attached temporarily to a tractor trailer preferably onto the rear panel to provide a bright illuminated warning of a stalled tractor trailer. The strip includes a means to attach the strip at each end of the strip along with a battery that provides a power source for the strip.

Figure 1:
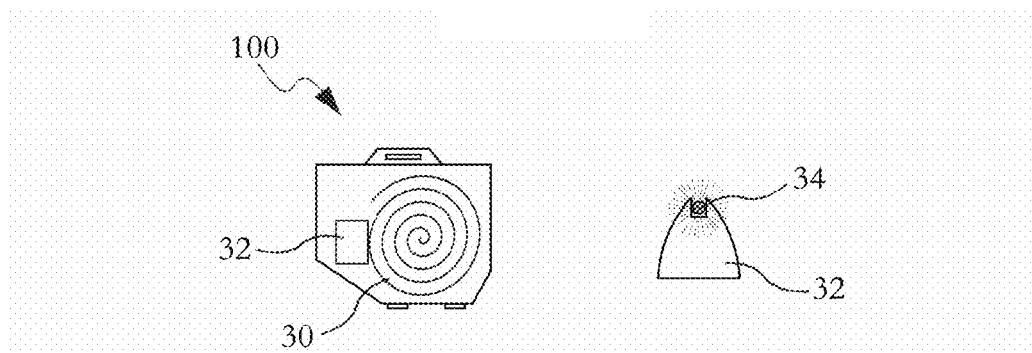
FIG. 1 depicts a carrying case used in conjunction with the present invention.
Figure 2:
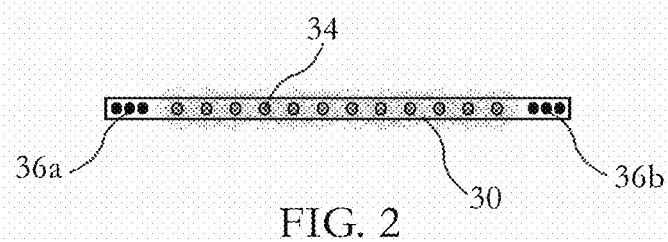
FIG. 2 depicts a lighting strip in accordance with the present invention.
Figure 3:
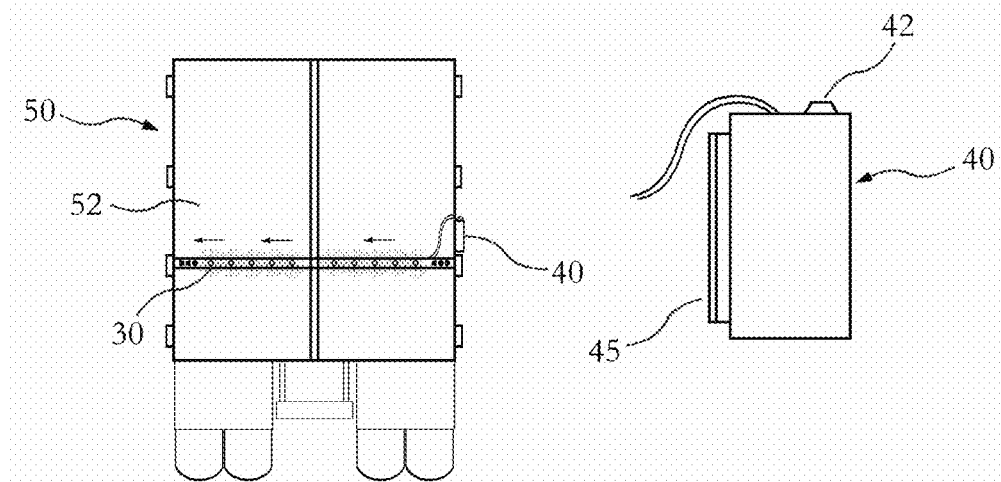
FIG. 3 depicts the application of the lighting strip onto a rear panel of a tractor trailer and a battery used in conjunction with the lighting strip in accordance with the present invention.

In reference to FIG. 1, a Carrying Case 100 is depicted, which encloses a Portable Lighting Strip 30. As shown in the Carrying Case 100, the Strip 30 is preferably stored in a coiled position with a rubber molding 32 used to mount the Strip 30 within the carrying case. A side view of the Rubber Molding 32 is shown in FIG. 1. The Rubber Molding 32 supports the Strip 30 once mounted onto a tractor trailer. FIG. 2 depicts the Portable Lighting Strip 30 with a First Attachment End 36a and a Second Attachment End 36b. Across this length of the Strip 30 is a series of LED Lights 34. The use of the Strip 30 onto a tractor trailer is demonstrated in FIG. 3. As shown, the Strip 30 is extended across a Back Panel 52 of a Trailer 50. A Power Source 40 is provided that is preferably a DC battery that provides the power source for the series of LED Lights 34 across the Strip 30. When extended across the Back Panel 52 this strip 30 provides an excellent means to illuminate the trailer and to warn oncoming traffic of a stalled tractor trailer. Further shown in FIG. 4 is the Power Source 40. The Power Source 40 may further include an on and off Switch 42, which provides a functional toggle switch for the battery and lighting. Further a Magnetic Attachment 45 is provided on one side of the Power Source 40. This magnetic attachment 45 provides a means to attach the power source to the side of the vehicle as shown in FIG. 3.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. An emergency lighting system comprising:
    a portable strip adapted for temporary placement across a rear panel of a trailer;
    a series of LED lights extending across the strip;
    a series of eyelets, wherein the series of eyelets enable the attachment of the portable strip to the rear panel;
    a carrying case, where the carrying case stores the portable strip in a coiled position during non-use; and
    a power source for the portable strip.

2. The emergency lighting system according to claim 1, where the power source is a battery.

3. The emergency lighting source according to claim 2, wherein the power source includes an on and off switch.

4. The emergency lighting system according to claim 2, wherein the power source includes a means to attach.

5. The emergency lighting system according to claim 4 wherein the means to attach the power source includes a magnet.

6. An emergency lighting system comprising:
    a portable strip adapted for temporary placement across a rear panel of a trailer, where the portable strip includes a rubber molding;
    a series of LED lights extending across the strip;
    a series of eyelets, wherein the series of eyelets enable the attachment of the portable strip to the rear panel;

a carrying case, where the carrying case is adapted to store the portable lighting strip during non-use in a coiled position; and a power source for the portable strip.

* * * * *